(12) United States Patent
Himmelmann

(10) Patent No.: US 8,162,762 B2
(45) Date of Patent: Apr. 24, 2012

(54) GENERATOR FLEXIBLE DRIVE COUPLING

(75) Inventor: Richard A. Himmelmann, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 214 days.

(21) Appl. No.: 12/496,221

(22) Filed: Jul. 1, 2009

(65) Prior Publication Data
US 2011/0001402 A1   Jan. 6, 2011

(51) Int. Cl.
F16D 3/62 (2006.01)
F16D 3/00 (2006.01)
F16D 3/10 (2006.01)
H02K 7/10 (2006.01)

(52) U.S. Cl. ............ 464/99; 464/69; 464/98; 310/75 D; 474/94

(58) Field of Classification Search ............ 310/51, 310/75 R, 75 D, 79; 464/79, 80, 99, 69, 180, 464/78, 902; 474/94, 148, 168, 170, 174
See application file for complete search history.

(56) References Cited

U.S. PATENT DOCUMENTS

| | | | |
|---|---|---|---|
| 2,647,380 A * | 8/1953 | Troeger et al. | 464/99 |
| 2,950,609 A | 8/1960 | Goodloe | |
| 3,834,181 A * | 9/1974 | Strasburg et al. | 464/96 |
| 4,203,304 A * | 5/1980 | Decker | 464/99 |
| 4,265,099 A * | 5/1981 | Johnson et al. | 464/99 |
| 5,000,722 A | 3/1991 | Zilberman | |
| 5,041,060 A * | 8/1991 | Hendershot | 464/86 |
| 5,238,454 A * | 8/1993 | Schmidt | 464/99 |
| 5,324,237 A * | 6/1994 | Bilsing et al. | 474/94 |
| 5,697,848 A | 12/1997 | Bosley | |
| 5,755,622 A * | 5/1998 | Kanki et al. | 464/99 |
| 6,091,168 A | 7/2000 | Halsey et al. | |
| 6,174,254 B1 | 1/2001 | Tsai | |
| 6,364,772 B1 | 4/2002 | Sugden | |
| 6,623,362 B1 | 9/2003 | Walter et al. | |
| 6,669,569 B2 | 12/2003 | Geislinger | |
| 6,966,867 B2 | 11/2005 | Tajima et al. | |
| 7,017,693 B2 | 3/2006 | Omote et al. | |
| 7,070,033 B2 * | 7/2006 | Jansen et al. | 192/41 S |
| 7,111,698 B2 | 9/2006 | Tajima et al. | |
| 7,153,227 B2 * | 12/2006 | Dell et al. | 474/70 |

(Continued)

FOREIGN PATENT DOCUMENTS
DE   8702203 U1   4/1987
(Continued)

OTHER PUBLICATIONS

European Search Report, Application No. 10251167.2-2423, dated Nov. 23, 2010, 6 pages.

(Continued)

Primary Examiner — Burton Mullins
(74) Attorney, Agent, or Firm — Cantor Colburn LLP

(57) ABSTRACT

A generator assembly (6) includes a crankshaft (10), an accessory pulley drive shaft (36) operatively coupled to the crankshaft (10), and a flexible drive coupling member (40) operatively coupling the accessory pulley drive shaft (36) and the crank shaft (10). The flexible drive coupling member (40) includes a plurality of flex drive rings (64-66) that are configured to transmit torque from the crankshaft (10) to the accessory pulley drive shaft (36) with substantially no torsional deflection while allowing the accessory pulley drive shaft (36) to deflect radially under radial load and deflect axially under axial load in order to accommodate misalignment of the accessory pulley drive shaft (36).

16 Claims, 5 Drawing Sheets

U.S. PATENT DOCUMENTS

| | | | |
|---|---|---|---|
| 7,370,716 B2 | 5/2008 | Hickam | |
| 7,464,800 B2 | 12/2008 | Nerubenko | |
| 7,528,499 B2 | 5/2009 | Suttie | |
| 7,896,748 B2 * | 3/2011 | Muskus et al. | 464/79 |
| 7,959,512 B2 * | 6/2011 | Durand et al. | 464/99 |
| 2005/0124419 A1 | 6/2005 | Zilberman et al. | |
| 2007/0049379 A1 * | 3/2007 | Faass et al. | 464/79 |
| 2008/0176661 A1 * | 7/2008 | Smith | 464/99 |

FOREIGN PATENT DOCUMENTS

| | | | |
|---|---|---|---|
| DE | 19821948 A1 | 2/1999 | |
| EP | 0980987 A2 | 2/2000 | |
| EP | 1164305 A2 | 12/2001 | |
| EP | 1394431 A2 | 3/2004 | |

OTHER PUBLICATIONS

European Examination Report for corresponding EP Application No. 10 251 167.2-2423, dated Aug. 26, 2011, pp. 1-3.

Korean Office Action for corresponding KR Application No. 10-2010-57484, dated Oct. 10, 2010, pp. 1-14.

* cited by examiner

GENERATOR FLEXIBLE DRIVE COUPLING

BACKGROUND OF THE INVENTION

The subject matter disclosed herein relates to the art of electrical generators and, more particularly, to a flexible drive coupling for an electrical generator.

Many modern vehicles utilize electronic and other devices that possess large power demands. Commercial vehicles, such as semi-trailers, now include both computer and entertainment systems. Military vehicles include computer equipment as well as radars, communication equipment and weapon systems all of which possess high energy demands. In order to meet these increasing energy demands, many vehicles now include generator systems configured for use in conjunction with low speed reciprocating engines.

BRIEF DESCRIPTION OF THE INVENTION

According to one aspect of the invention, a generator assembly includes a crankshaft, an accessory pulley drive shaft operatively coupled to the crankshaft, and a flexible drive coupling member operatively coupling the accessory pulley drive shaft and the crankshaft. The flexible drive coupling member includes a plurality of flex drive rings that are configured to transmit torque from the crankshaft to the accessory pulley drive shaft with substantially no torsional deflection while allowing the accessory pulley drive shaft to deflect radially under radial load and deflect axially under axial load in order to accommodate misalignment of the accessory pulley drive shaft According to another aspect of the invention, a generator system includes an engine including a crankshaft, an accessory pulley drive shaft operatively coupled to the crankshaft, and a flexible drive coupling member operatively coupling the accessory pulley drive shaft and the crankshaft. The flexible drive coupling member includes a plurality of flex drive rings that are configured to transmit torque from the crankshaft to the accessory pulley drive shaft with substantially no torsional deflection while allowing the accessory pulley drive shaft to deflect radially under radial load and deflect axially under axial load in order to accommodate misalignment of the accessory pulley drive shaft relative to the crankshaft.

According to yet another aspect of the exemplary embodiment, a flexible drive coupling member includes a plurality of flex drive rings. Each of the plurality of flex drive rings includes a main body having central opening and an outer edge portion. Adjacent ones of the plurality of flex drive rings are joined to form a resilient connection for transmitting torque from a driving member to a driven member with substantially no torsional deflection while allowing the driven member to deflect radially under radial load and deflect axially under axial load in order to accommodate misalignment of the driven member and the drive member.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
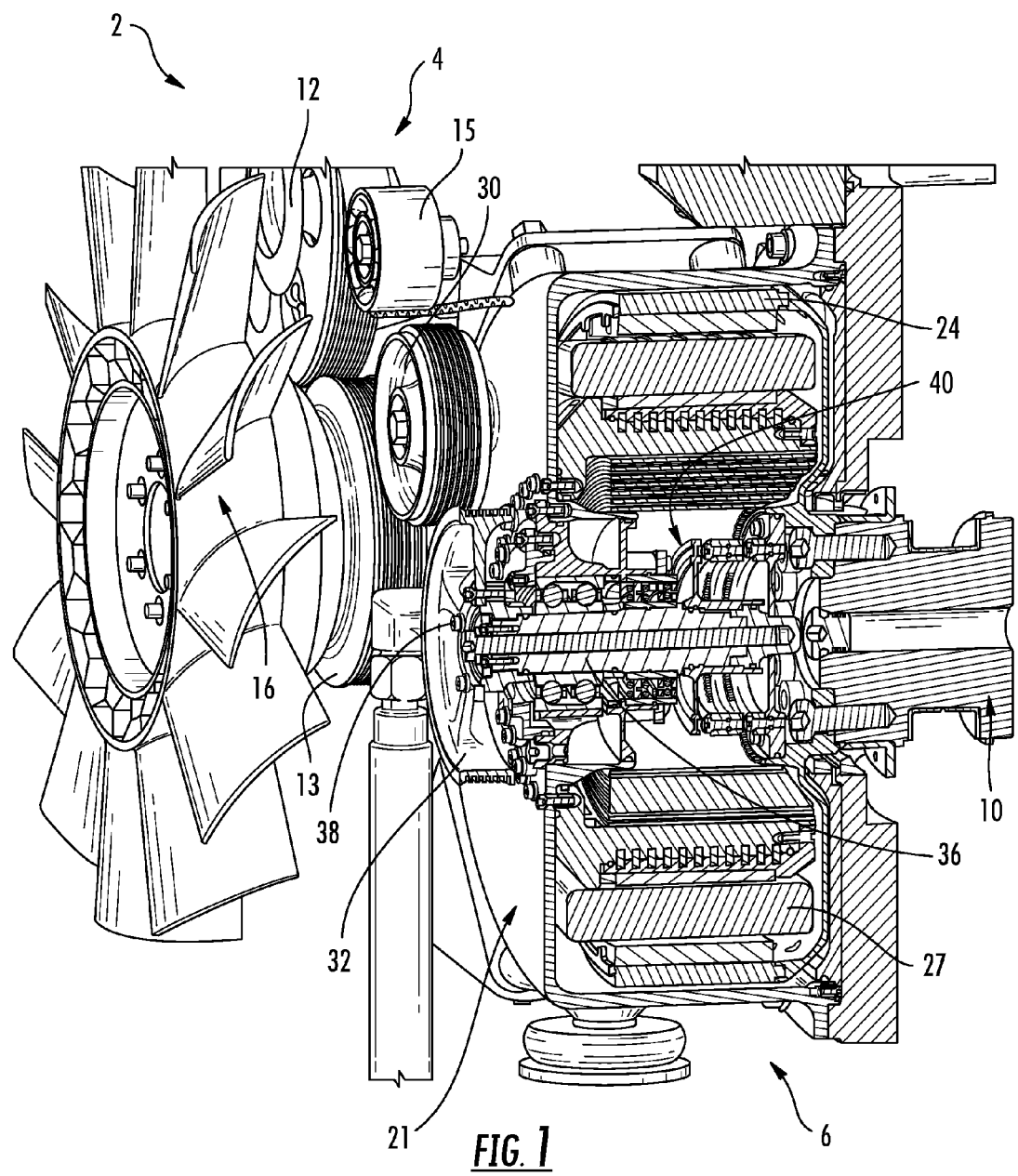
FIG. 1 is a cross-sectional perspective view of a motor generator assembly including a motor portion and a generator assembly in accordance with an exemplary embodiment.
Figure 2:
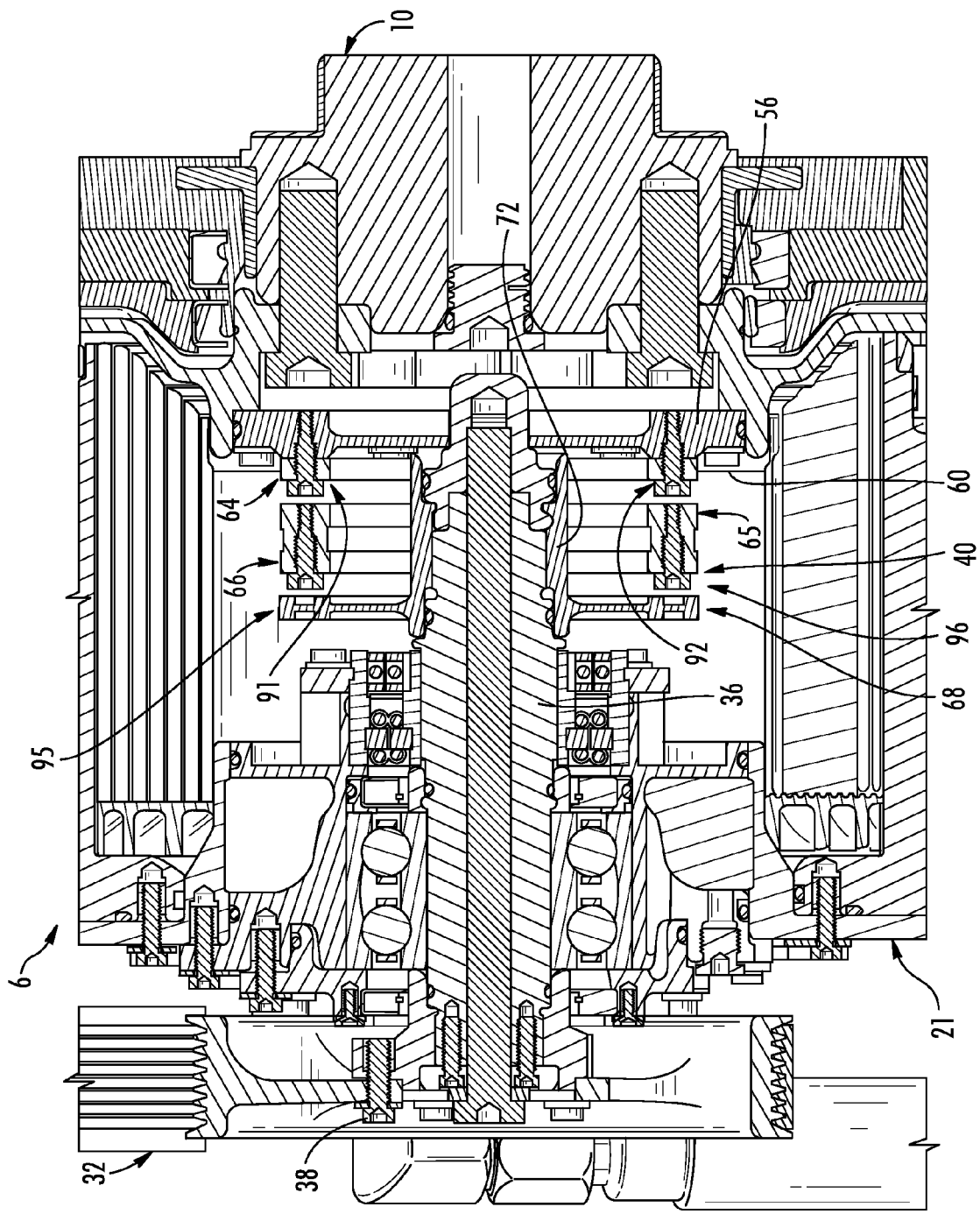
FIG. 2 is a cross-sectional elevational view of the generator assembly of the motor generator of FIG. 1.

With reference to FIGS. 1 and 2, a generator system shown in the form or a motor generator constructed in accordance with an exemplary embodiment is indicated generally at 2. Motor generator 2 includes a motor portion 4 and a generator assembly 6. Motor portion 4 takes the form of an internal combustion engine including a plurality of pistons (not shown) operatively connected to a driving member or crankshaft 10. Motor portion 4 is also shown to include a plurality of accessory pulleys of 12 and 13 as well as an idler pulley 15 and a fan 16. In further accordance with the exemplary embodiment shown, generator assembly 6 includes a housing 21 within which is positioned a rotor 24 and a stator 27 that includes a plurality of windings (not shown). Generator assembly 6 includes a first accessory pulley 30 and a second accessory pulley 32. Accessory pulley 32 is operatively connected to crankshaft 10 through a driven member or accessory pulley draft shaft 36 by a plurality of mechanical fasteners, one of which is indicated as 38. Accessory pulley draft shaft 36 is operatively connected to crankshaft 10 via a flexible drive coupling member 40. Flexible drive coupling member 40 allows for alignment variations between accessory pulley draft shaft 36 and crankshaft 10 in a manner that will be discussed more fully below.

Figure 3:
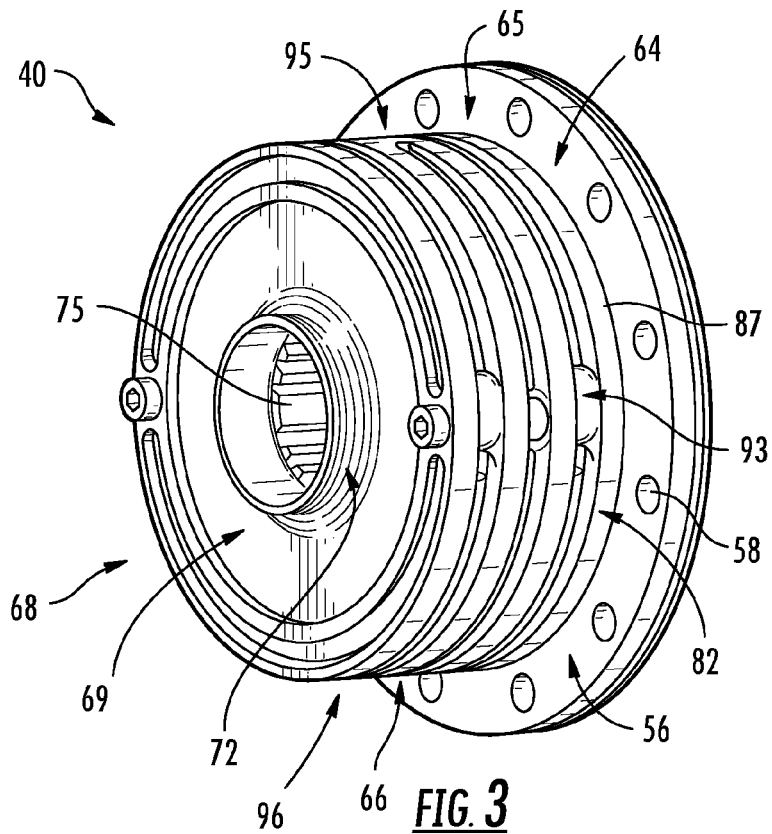
FIG. 3 is a lower right perspective view of a flexible drive coupling member of the generator assembly of FIG. 2 in accordance with an exemplary embodiment.
Figure 4:
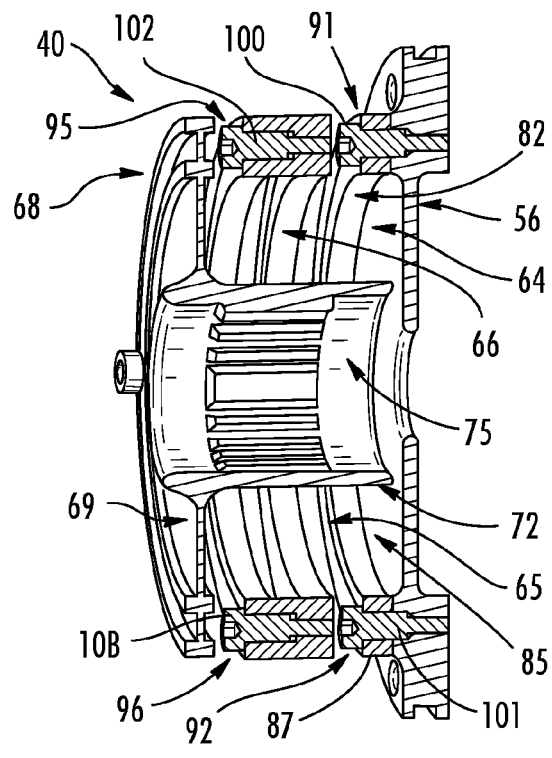
FIG. 4 is a cross-sectional elevational view of the flexible drive coupling member of FIG. 3.

As best shown in FIGS. 3 and 4, flexible drive coupling member 40 includes a base plate 46 having a plurality of openings, one of which is indicated at 58, for receiving mechanical fasteners 60 (FIG. 2) that retain flexible drive coupling member 40 to crankshaft 10. Flexible drive coupling member 40 is also shown to include a plurality of flex drive rings 64-66 which, as will be discussed more fully below, provide axial flexation about multiple axes in order to accommodate any misalignments between accessory pulley drive shaft 36 and crankshaft 10. In addition, to flex drive rings 64-66, flexible drive coupling member 40 includes a flexible drive ring that takes the form of a shaft attachment plate 68. Shaft attachment plate 68 includes a main body portion 69 provided with a central hub 72 that includes a splined portion 75. Splined portion 75 is configured to receive a corresponding splined portion (not shown) of accessory pulley drive shaft 36. Of course it should be understood that central hub 72 can be joined to accessory pulley drive shaft 36 using a key, bolts, a press fit or the like. As each flex drive rings 64-66 is similarly formed, a detailed description will follow with respect to flex drive ring 64, with an understanding that the remaining flex drive rings, i.e., flex drive rings 65 and 66, include corresponding structure.

As shown, flex drive ring 64 includes a main body 82 having a central opening 85 and an outer edge portion 87. A pair of connection zones 91 and 92 are arranged on main body 82 between central openings 85 and 87. Flex drive ring 64 also includes a second pair of connecting zones, namely connecting zone 94 and an opposing connecting zone (not shown) that are off-set 90 degrees from connecting zones 91 and 92. With this arrangement, connecting zones 91 and 92 connect flex drive ring 64 to base plate 56 while connecting zone 93 and opposing connecting zone (not shown) couple flex drive ring 64 to adjacent flex drive ring 65. In a similar manner, coupling is achieved between flex drive ring 65 and flex drive ring 66, and between flex drive ring 66 and shaft attachment plate 68.

With this arrangement, multiple flex drive rings, connected at 90 degree intervals, allow shaft attachment plate 68 to radially deflect under radial load, and axially deflect under axial load. This is, flex drive rings 64-66 and shaft attachment plate 68 act as springs in the axial direction. In addition, by keeping stress below an infinite life stress strain curve for a particular material flex drive rings 64-66 and shaft attachment plate 68 are able to accommodate both axial and radial shaft misalignment without incurring wear. In any event, in the exemplary embodiment shown, flex drive rings 64-66 and shaft attachment plate 68 are joined at connector zones 91-93 through the use of mechanical fasteners such as indicated at 100-103 in FIG. 4.

Figure 5:
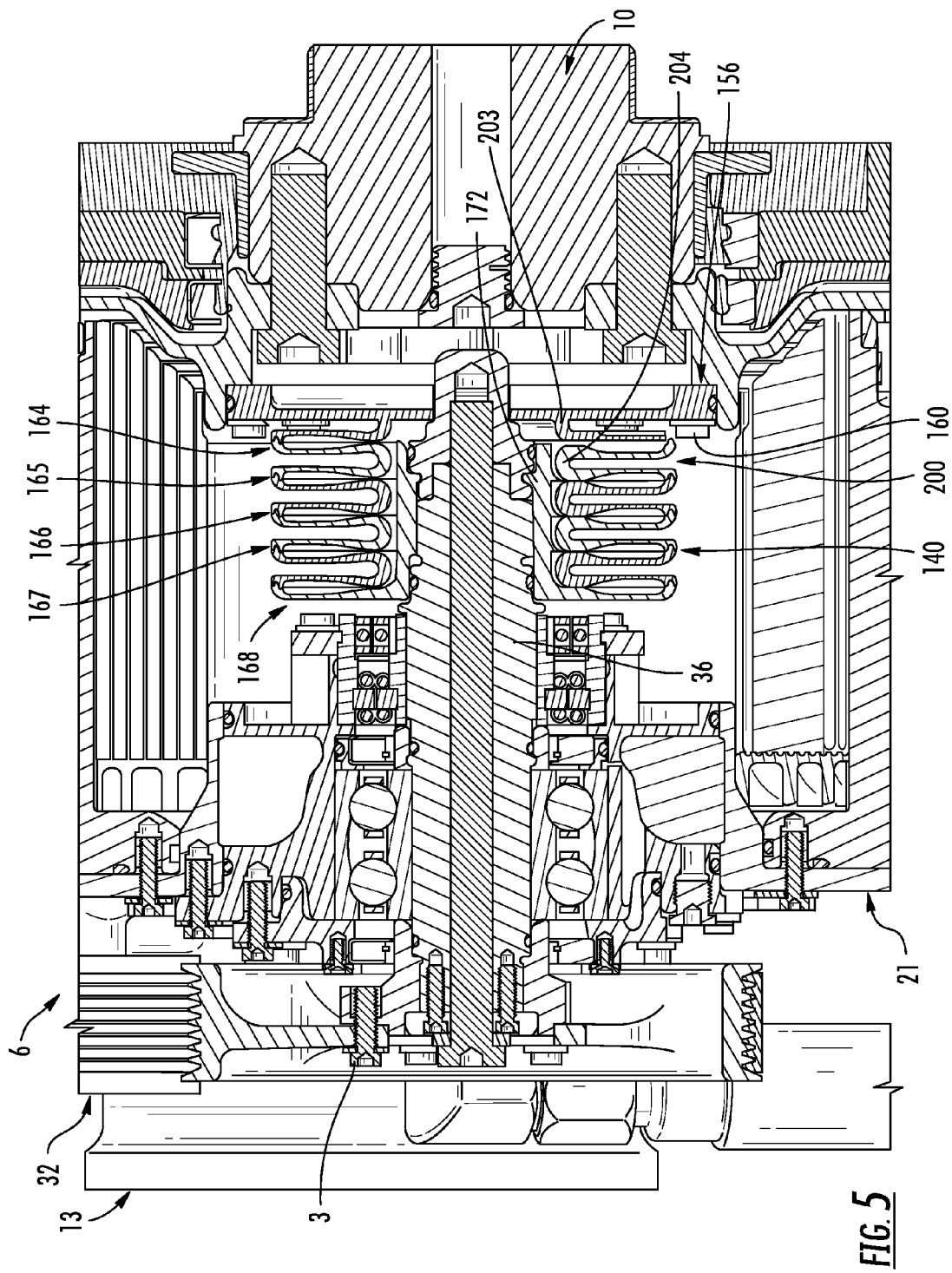
FIG. 5 is a cross-sectional elevational view of a generator assembly including a flexible drive member in accordance with another exemplary embodiment.
Figure 6:
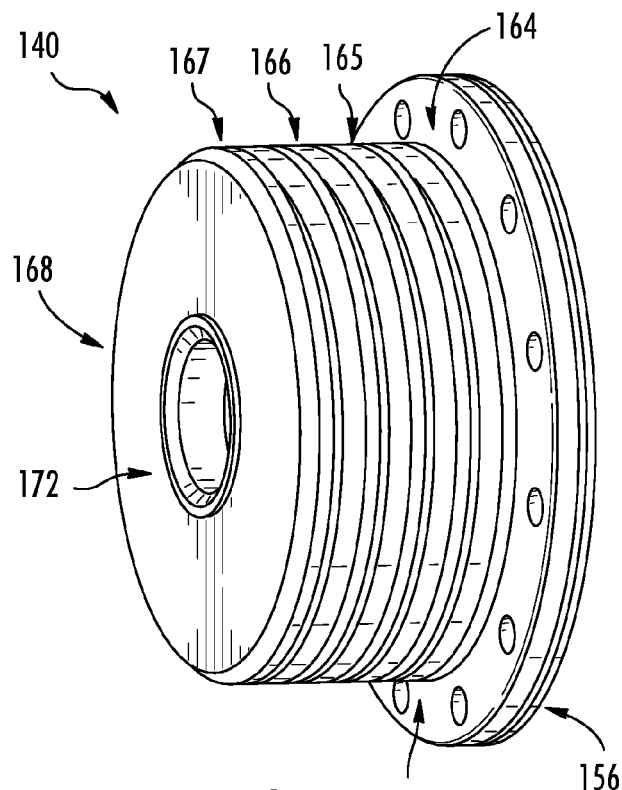
FIG. 6 is a lower right perspective view of a flexible drive coupling member of the generator assembly of FIG. 5 in accordance with an exemplary embodiment.
Figure 7:
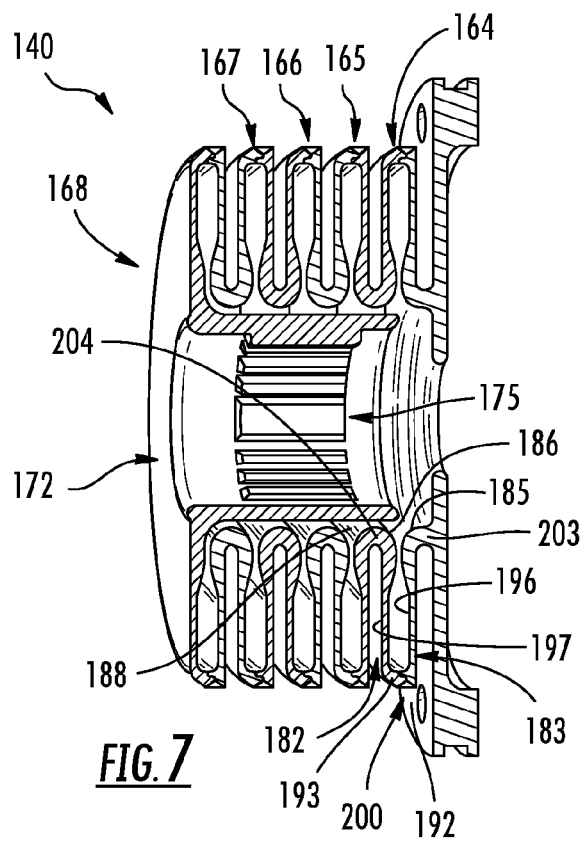
FIG. 7 is a cross-sectional elevational view of the flexible drive coupling member of FIG. 6.

Reference will now be made to FIGS. 5-7, wherein like reference numerals represent corresponding parts in the respective views, in describing a flexible drive coupling member 140 constructed in accordance with another exemplary embodiment. As shown, flexible drive coupling member 140 includes a base plate 156 having a plurality of openings 158 for receiving mechanical fasteners, such as indicated at 160 in FIG. 5. Mechanical fastener 160 secures base plate 156 to crankshaft 10. Flexible drive coupling member 140 is also shown to include a plurality of flex drive rings 164-167 as well as an additional flex drive ring that takes the form of a shaft attachment plate 168. Shaft attachment plate 168 includes a main body portion 169 having a central hub 172 including a splined portion 175 that is configured to matingly receive corresponding splines on accessory pulley drive shaft 36. Of course it should be understood that central hub 172 can be joined to accessory pulley drive shaft 36 using a keyed connection, bolts, a press fit, or the like. As each flex drive rings 164-167 is similarly formed, a detailed description will follow with regard to flex drive ring 164 with an understanding that the remaining flex drive rings 165-167 include similar structure.

As shown, flex drive ring 164 includes a first flex member 182 and a second flex member 183. First and second flex members 182 and 183 include corresponding inner edge portions 185, 186 that define central openings 188 and 189 respectively. In addition, first and second flex members 182 and 183 include outer edge portions 192 and 193 respectively. A flexible radial web 196 extends between inner edge 185 and outer edge 192 of first flex member. Similarly, a flexible radial web 197 extends between inner edge 186 and outer edge 193 of second flex member 183.

In accordance with the exemplary embodiment, first and second flex members 182 and 183 are secured one to the other at outer edges 192 and 193 through a mechanical joining process, such as welding. Inner edges 185 and 186 are secured to base plate 156 and adjacent flex drive ring 165 via flexible connecting members 203 and 204 respectively. With this arrangement, flexible drive coupling member 140 allows shaft attachment plate 168 to radially deflect under radial load and axially deflect under axial load. That is, each flex drive ring 164-167 and shaft attachment plate 168 act as springs. In a manner similar to that described above, by maintaining stress below an infinite like stress strain curve for a particular material, flex drive rings 164-167 and shaft attachment plate 168 are able to accommodate both radial and axial shaft misalignments without incurring wear.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A generator assembly comprising:
   a crankshaft;
   an accessory pulley drive shaft operatively coupled to the crankshaft; and
   a flexible drive coupling member operatively coupling the accessory pulley drive shaft and the crankshaft, the flexible drive coupling member including a plurality of flex drive rings that are configured to transmit torque from the crankshaft to the accessory pulley drive shaft with substantially no torsional deflection while allowing the accessory pulley drive shaft to deflect radially under radial load and deflect axially under axial load in order to accommodate misalignment of the accessory pulley drive shaft, wherein the flexible drive coupling member includes a shaft attachment plate and a base plate, the shaft attachment plate including a central hub that extends into the plurality of flex drive rings and is configured to receive the accessory pulley drive shaft, the shaft attachment plate being joined to the base plate through the plurality of flex drive rings.

2. The generator assembly according to claim 1, wherein the central hub includes a splined portion.

3. The generator assembly according to claim 1, wherein the each of the plurality of flex drive rings includes a main body having central opening and an outer edge portion.

4. The generator assembly according to claim 3, wherein select adjacent ones of the plurality of flex drive rings are joined through the main body at a connecting zone.

5. The generator assembly according to claim 4, wherein other select ones of the plurality of flex drive rings are joined through the main body at another connecting zone, the other connecting zone being at a position about 90-degrees off-set from the connecting zone.

6. The generator assembly according to claim 5, wherein the select ones and the other select ones of the flex drive rings are joined by mechanical fasteners in the connecting zone and the other connecting zone respectively.

7. The generator assembly according to claim 3, wherein select adjacent ones of the plurality of flex drive rings are joined through the outer edge portion.

8. The generator assembly according to claim 7, wherein the select adjacent ones of the plurality of flex drive rings are joined through a welding process.

9. The generator assembly according to claim 8, wherein other select adjacent ones of the plurality of flex drive rings are joined though a flexible connector member.

10. The generator assembly according to claim 9, wherein each main body of each of the plurality of flex drive rings includes a flexible radial web.

11. The generator assembly according to claim 3, wherein the central hub extends into the plurality of flex drive rings.

12. A generator system comprising:
   a motor portion including a crankshaft;
   an accessory pulley drive shaft operatively coupled to the crankshaft; and
   a flexible drive coupling member operatively coupling the accessory pulley drive shaft and the crankshaft, the flexible drive coupling member including a plurality of flex drive rings that are configured to transmit torque from the crankshaft to the accessory pulley drive shaft with substantially no torsional deflection while allowing the accessory pulley drive shaft to deflect radially under radial load and deflect axially under axial load in order to accommodate misalignment of the accessory pulley drive shaft relative to the crankshaft, wherein select adjacent ones of the plurality of flex drive rings are joined through the main body at a connecting zone and other select ones of the plurality of flex drive rings are joined through the main body at another connecting zone, the other connecting zone being at a position about 90-degrees off-set from the connecting zone.

13. The generator system according to claim 12, wherein the flexible drive coupling member includes a shaft attachment plate and a base plate, the shaft attachment plate being joined to the base plate through the plurality of flex drive rings.

14. The generator system according to claim 13, wherein the each of the plurality of flex drive rings includes a main body having central opening and an outer edge portion.

15. The generator system according to claim 14, wherein select adjacent ones of the plurality of flex drive rings are joined through the main body at a connecting zone.

16. A flexible drive coupling member comprising:
   a plurality of flex drive rings, each including a main body having central opening and an outer edge portion, wherein adjacent ones of the plurality of flex drive rings are joined to form a resilient connection for transmitting torque from a driving member to a driven member with substantially no torsional deflection while allowing the driven member to deflect radially under radial load and deflect axially under axial load in order to accommodate misalignment of the driven member and the drive member, wherein select adjacent ones of the plurality of flex drive rings are joined through the main body at a connecting zone and other select ones of the plurality of flex drive rings are joined through the main body at another connecting zone, the other connecting zone being at a position about 90-degrees off-set from the connecting zone.

* * * * *